United States Patent [19]

Berkoff

[11] Patent Number: 4,670,284
[45] Date of Patent: Jun. 2, 1987

[54] EDIBLE NUT AND FRUIT GRANULE PRODUCT AND PROCESS

[76] Inventor: William Berkoff, 6143 W. Olympic Blvd., Los Angeles, Calif. 90048

[21] Appl. No.: 738,267

[22] Filed: May 28, 1985

[51] Int. Cl.$^4$ .............................................. A23L 1/38
[52] U.S. Cl. .................................... 426/633; 426/518
[58] Field of Search ...................... 426/633, 507, 518

[56] References Cited

U.S. PATENT DOCUMENTS 2,511,115  6/1950  Lazier .................................. 426/633

OTHER PUBLICATIONS

Horton, Country Commune Cooking, published by Coward, McCann & Geoghegan, Inc., N.Y., 1972 (pp. 210–211).

Primary Examiner—George Yeung
Attorney, Agent, or Firm—Thomas A. Turner, Jr.; Seymour A. Scholnick

[57] ABSTRACT

Peanuts, almonds, Brazil nuts, hazelnuts and similar hard, dry roastable nuts with raisins or currants or both are maintained stable at granular sizes from 015 to 120 screen sizes. Raisins or currants or both are wetted in a heated liquid having the substantial effect of removing surface sugars and oils. The raisins, currants or both are treated further either by simultaneously wetting in the presence of flaxseeds or by pressing to a damp-dry state. The raisins, currants or both are mixed with a hard, dry roasted nut before granulating into from 015 to 120 screen sizes.

20 Claims, 2 Drawing Figures

EDIBLE NUT AND FRUIT GRANULE PRODUCT AND PROCESS

BACKGROUND OF THE INVENTION

1. Field of the Invention

The present invention relates to processes for preparing edible food products and to stable and workable food ingredients for food products, and more particularly relates to fruit and nut processing into stable ingredients.

2. Description of the Prior Art

In the past, the result of pulverizing hard, dry roastable nuts such as peanuts, almonds, Brazil nuts, hazelnuts and the like has ultimately been a butter of the nut such as, for example, peanut butter. Hereafter in this specification, "hard" and "dry roasted" when used in reference to nuts are intended to mean relatively brittle nuts which when dry roasted will break when initially impacted by a blunt instrument into smaller particles. Sometimes the adjective "crispy" is and may be used herein to describe the brittle characteristic of such hard nuts. It is almost impossible to reduce such hard nuts into a powder without such nuts changing into their butter state. Powders are defined usually at screen sizes of 000 or minus ($-000$).

Miyata, et al., U.S. Pat. No. 4,053,653 describes a method of segregating lupulin-rich products by crushing hops useful in brewing beer in a cold temperature on the order of $-20$ degrees C. Inoue, et al., U.S. Pat. No. 4,281,027 describes a method of "extending" cocoa by pulverizing the cocoa shell into a powder and mixing the resultant powder with cocoa butter or powder. While there is no elucidation of the requirement for cold temperature in Miyata, et al., except to indicate that it facilitates crushing, Inoue, et al., performs their pulverization at $-50$ degrees C. in order to preserve the strong cocoa flavor from loss due to oxidation or other chemical reactions. The resultant powder, however, must be further treated by heating in order to accomplish astringency extraction.

In another beer ingredient preparation, Redl, U.S. Pat. No. 4,304,176 describes adding steeping water to barley or malt in the conventional wet crushing mill. While interesting, these descriptions relate to powdered food ingredients which reduced to powder do not form a butter and otherwise have significantly different characteristics from hard nuts. Further, these processes have as their primary objective the preserving of the flavor of the individual ingredient itself in conventional brewing or food-extending processes.

Many pre-prepared food products use hard nuts such as peanuts as a major ingredient in a mixture or blend. Use of such nuts in chunky sizes provides a delightful crunch to the bite, in addition to the natural flavoring provided by the nut itself. In other nut-based food products, hard nuts are reduced to their butter state and blended with the other ingredients. Working with nut butters, however, is very difficult since the butter is only very slightly viscous, indeed sticky and requires frequent cleaning from food processing equipment and special handling equipment or arrangements for moving the nut-butter along.

It has been desired to have hard nuts converted into a workable granular state which will change into a butter state when blended and after being mixed with other food ingredients, but will remain in the granular state up to and during processing. It is also desired to accomplish such a goal without the necessity of complex temperature controls and the attendent elaborate equipment for maintaining very cold freezing of the solid food ingredients.

It has long been desired to have peanut butter and like nut butter in a granule state that can be incorporated into baked goods, confections, cereals and cereal-like products to enhance the flavor and impart a peanut butter or like nut butter flavor with a natural sweetening element. It has also been desired to have a breading composition having a peanut butter or a like nut butter flavor. It is yet further desired to increase the binding characteristics of breading products.

SUMMARY

In brief, in accordance with one aspect of the present invention, hard nuts, such as peanuts, almonds, Brazil nuts, hazelnuts (or filberts) and similar nuts are mixed with raisins, currants or both in a ratio of at least two ounces of the fruit per pound by weight of the total mixture. The fruit, either raisins, currants or both are wetted in heated liquid, such as water at a temperature in the range of of from approximately 110 degrees Fahrenheit (°F.) to boiling for a short time. The raisin is substantially hydrated, and surface sugars and oils are substantially removed. The mixture is then ground in a hammer mill to screen sizes of from 015 to 120, which are granular and appear as individual cells of a butter of the nut and fruit.

In one embodiment, the raisins, currants or both are wetted in the heated water in the presence of approximately two pounds or more of flaxseeds per fifty gallons of water. In an alternative embodiment, the raisins, currants or both, after wetting are pressed to a substantially damp-dry state and shakened loose from each other before mixing with the nuts.

The resultant product is unique, having a unique taste and can be handled with conventional and more simple ingredient handling equipment than is normally required with nut butter handling equipment. When blended with other food ingredients and heated, the granular product emulsifies or forms into the butter state having an amorphus or an emulsion quality favored as the intermediate or end food product. Meanwhile during storage and during ingredient handling, the product remains granular.

Other novel features which are believed to be characteristic of the invention, both as to organization and as to method of operation, together with further objects and advantages thereof, will be better understood from the following description considered in conjunction with the accompanying drawings in which several preferred embodiments of the invention are illustrated by way of example. It is to be understood, however, that the drawings are for the purpose of illustration and description only, and are not intended as a definition of the limits of the invention.

DESCRIPTION OF THE PREFERRED EMBODIMENT

Reference being had initially to FIG. of the drawings, the present invention involves the processing of peanuts, almonds, Brazil nuts, hazelnuts (or filberts). The nut is first dry-roasted 10, which generally produces a hard, brittle nut sometimes described as crispy. Raisins, currants or both are wetted 12 in a tank of pre-heated water in the presence of flaxseeds which are kept separate within their own perforated container capable of allowing water to flow through it. The wetting process or step seems to remove surface sugars and oils of the fruit which apparently hamper the ability to work with them in food processing equipment. The water may be pre-heated to any temperature up to the boiling point. The hotter the water, the shorter the time required to accomplish the desired removal of the surface sugars and oils.

The nuts and the raisins, currants or both are mixed in a preselected ratio 14 and ground 16 and forced through a screen size. The resultant product, when the ratio of the nut to the raisins, currants or both are as further taught herein, is a nut butter and raisin, currant or both granule or cell which generally will remain stable in consistency and size while being handled and manipulated into food formulations, but which will change into an emulsion of the nut butter and the raisins, currants or both upon slightly heating and/or blending.

Figure 1:
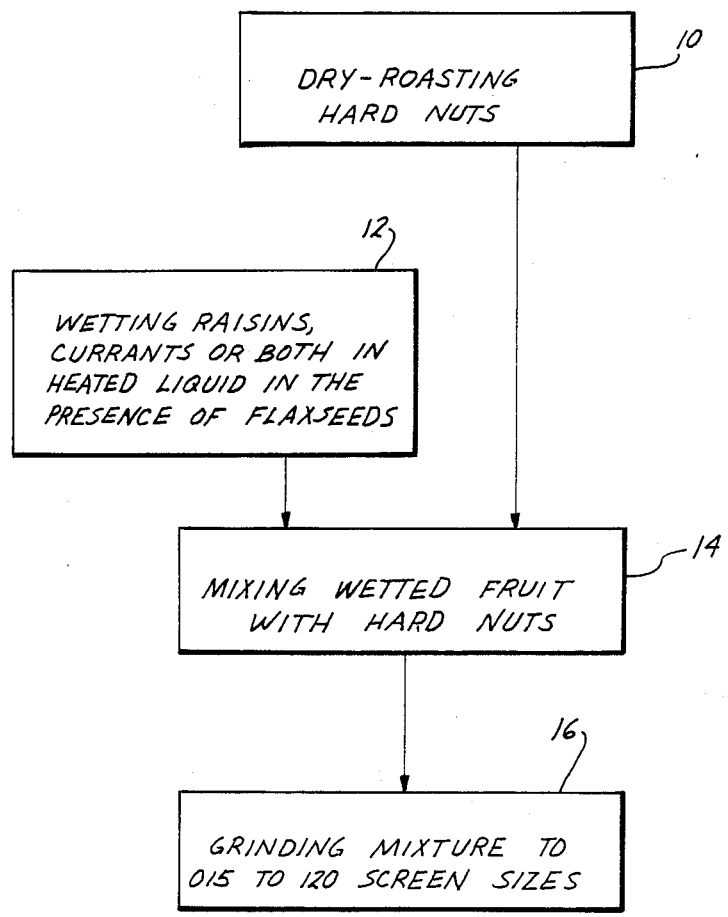
FIG. 1 is block flow diagram of the preferred method of the present invention.
Figure 2:
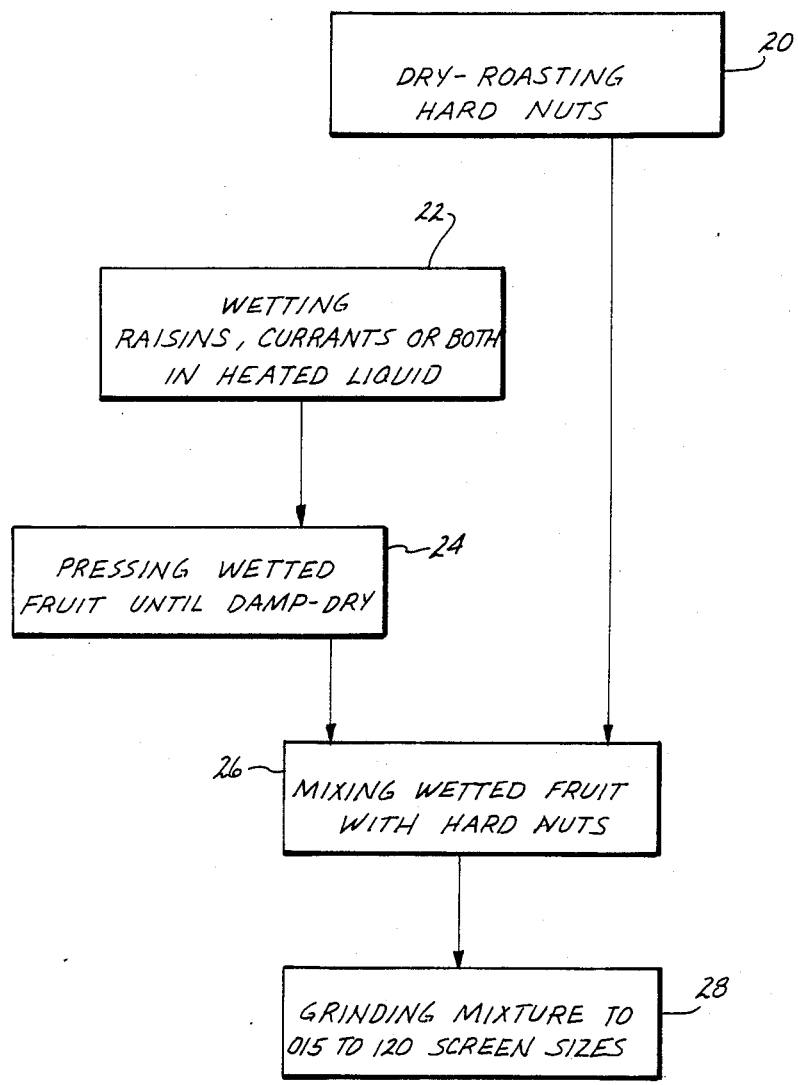
FIG. 2 is block diagram of an alternative method of the present invention.

An alternative embodiment of my invention comprises a slight variation of the preferred process described above, reference now being had to FIG. 2 of the drawings. The nuts are dry-roasted 20, as in the preferred embodiment described above. The raisins, currants or both are then wetted 22, but not in the presence of flaxseeds. It is found that the raisins, currants or both when removed from the wetting bath appear wet and congregate together somewhat even though the surface sugars and oils appear to be removed to a satisfactory degree. I then press 24 the raisins, currants or both until they are damp-dry, and find that with only slight agitation they are then separable easily and are very manageable in food processing equipment.

Again, I mix 26 the nuts with the raisins, currants or both together in a preselected ratio and feed them through a hammer mill where they are ground 28 and forced through a screen size. A granule or cell of the nut butter and of the raisins, currants or both results which is tasty and which is relatively easy to handle in preparing food formulations.

I have found that the product is especially useful and advantageous for imparting a peanut butter or like nut butter flavor with a natural sweetening element to baked goods, confections, cereals and cereal-like products. The product not only enhances the flavor of breading products, but also increases the binding characteristics of the breading products as well.

I have used several types of screens in the hammer mills described below. The shape of the granules described below has varied depending on the screen used, but only slightly. Some may prefer the shapes produced on one screen, such as a conidure over the shapes produced by another. The food handling characteristics of the product remains substantially the same regardless of the type of screen chosen.

As will be apparent from the following examples, the raisins, currants or both, i.e. the fruit must be kept above a limit in relation to the nut or the resultant product will not be a granule or cell-like product, but rather will be a butter of the nut. On the other hand, if too much of the fruit is used in relation to the nut, the resultant product will be unpredictable or unreliable as an element in food processing equipment, even though the result will be a taste which is unique and palatable.

The present invention will be better understood by way of the following examples:

EXAMPLE I

1. Preparation of the Nuts: Ninety-five (95) pounds of raw, blanched jumbo runner peanuts were placed in a 100 pound capacity rotary dry-roasting oven preheated to 575° F. where a perforated cylindrical basket contained the nuts. Fans forced ambient temperature air into the roaster oven where the heat is generated by electrical resistance heating coils and rods. After the insertion of the peanuts a temperature drop in the oven to approximately 400° F. was observed, and heat energy was applied in order to maintain or to build back up to a temperature of 450° F. After roasting the peanuts to a deep and rich golden color, which occured in forty (40) minutes, the peanuts were removed to a perforated conveyor where they were cooled by forced air at ambient temperature of from 60° F. to 75° F.

2. Preparation of the Fruit: Twenty-four pounds of dried, black raisins in perforated stainless steel baskets were placed into a stainless steel tank of water preheated to approximately from 190° F. to 200° F. After soaking for approximately ten (10) minutes, the raisins were removed from the water bath and gently pressed to remove a substantial amount of the water, surface oils and surface sugars until the raisins appeared to be in a damp-dry state. Some agitation of the raisins was advantageous in separating the raisins from each other.

3. The roasted peanuts and the damp-dried raisins are deposited from a metering dispenser onto a metering conveyor in rows having approximately four parts nuts to one part of raisins, and fed at this ratio into a hammer mill and ground into a screen size of 070.

The resultant product comprised a nut and fruit butter granule of 070 screen size which tended to bunch together into larger, but very loosely held together granule or a loosely knit collection of granules into larger granule sizes. These larger granule, however, tended to disintegrate back into granule sizes of 070 screen size when only slightly agitated or moved in any manner. Upon application of only a slight amount of heat or water, the granules changed into a butter state.

EXAMPLE II

1. Preparation of the Nut: Ninety-five (95) pounds of raw, blanched jumbo runner peanuts were prepared substantially in the manner as indicated in Example I, above.

2. Preparation of the Fruit: Approximately twenty-four (24) pounds of dried, black raisins in perforated stainless steel baskets are placed in a stainless steel tank of water preheated to approximately 190° F. to 200° F. for a period of approximately ten (10) minutes. Approximately one and one-half (1½) pounds of flaxseeds contained within perforated cylinders, the perforations of which being such that the flaxseeds are contained wholly within the cylinders, were placed in the heated water throughout the raisin soaking process. The raisins were then removed from the water tank and drained, without compressing the collection of raisins.

3. The roasted peanuts and the drained rasins are placed in separate bins from which each was deposited by a metering dispenser onto a conveyor in rows having approximately four parts of nuts to one part of raisins, and fed at this ratio into a hammer mill and ground into a screen size of 035.

The resultant product comprised granules of the nut and fruit butter which maintained the 035 screen size for one month, and it is believed that the product will sit on shelves for a very much longer and substantial period time. Upon application of only a slight amount of heat or water, the granules changed into a butter state. The taste of both the butter state and of the granule state appeared to slightly changed toward a less rich peanut flavor taste from the taste of the granules and butter of the Example I above.

EXAMPLE III

1. Preparation of the Nut: Eighty (80) pounds of raw shelled almonds were placed into a 100 pound rotary roasting oven preheated at 550° F. Forced air at ambient temperature is injected into the roasting oven during a roasting period of fifteen (15) minutes while heat was applied to maintain the oven temperature at approximately 475° F. The nuts were then removed to a perforated conveyor and cooled by forced air while the nuts are conveyed to a holding bin.

2. Preparation of the Fruit: Approximately twenty (20) pounds of dried, black raisins are prepared in substantially the same manner as set forth in Example I above, being pressed gently into a damp-dry state. The damp-dried raisins were slightly agitated in order to separate them for further conveyance.

3. The nuts and the raisins are deposited from separate holding bins by way of a metering dispenser onto a metering conveyor in a ratio of approximately four parts of nuts to one part of raisins, and conveyed in this ratio into a hammer mill where the mixture was ground to a screen size of 070.

The resulting product comprised a nut and fruit butter granules. After a while, the granules had a tendency to bunch together in a loosely knit collection of granules in a larger granule which tended to disintegrate back into granules of approximately 070 screen size when moved or agitated in only the slightest manner. Upon application of only a slight amount of heat or water, the granules changed into a butter state having a taste comparable to that of the granules.

PREAMBLE: EXAMPLES IV-VIII

1. Preparation of the Nut: One hundred (100) pounds of raw, blanched jumbo runner peanuts were dry roasted in a rotary oven roaster pre-heated to 575° F. The peanuts were contained during roasting in a perforated cylindrical basket. Fans forced ambient temperature air into the roaster oven where the heat was generated by electrical resistance heating coils and rods. Additional power was added to maintain the oven temperature at approximately 450° F. after the insertion of the raw peanuts. The peanuts were roasted for approximately forty (40) minutes when the nuts appeared to have a deep and rich golden color. The peanuts were removed to a perforated conveyor through which forced air at ambient temperatures of from 60° F. to 75° F. was forced to cool the nuts.

2. Preparation of the Fruit: Thirty (30) pounds of dried black raisins in perforated stainless steel baskets were placed into a stainless steel tank of water preheated to approximately 190° F. to 200° F. The tank also contained approximately one and one-half (1½) pounds of flaxseeds in a cylindrical, perforated stainless steel basket capable of retaining the flaxseeds there within but allowing the water to pass through it. After soaking for approximately ten (10) minutes, the raisins were removed and the water drained from the raisin containing baskets. Again, the raisins did not require agitation in order to separate them from each other, the raisins being workable after water draining.

The foregoing preparations were accomplished in anticipation of the following four runs, Examples IV-VIII.

EXAMPLE IV

Steps 1. and 2. are as given in the Preamble above.

3. Four (4) ounces of the so prepared dry-roasted peanuts and three-fourths (¾) ounce of the so prepared raisins were mixed together. The mixed nuts and fruit were then fed into a small hammer mill and forced thereby through a screen having a size of 093.

The resultant product was a peanut butter-and-raisin granule or cell whose size was determined by the screen size, in this instance 093. After observing the resultant product for some time, the granules were observed to have maintained their original size and continued to be stable substantially at that size.

EXAMPLE V

Steps 1. and 2. are as given in the Preamble above.

3. Eight (8) ounces of the so prepared dry-roasted peanuts and one (1) ounce of the so prepared raisins were mixed together. The so mixed nuts and fruit were then fed into a small hammer mill and forced thereby through a screen having a size of 093.

The resultant product was a peanut butter-and-raisin granule or cell whose size was determined by the screen size, in this instance 093. After observing the resultant product for some time, the granules were observed to have maintained their original size and continued to be stable substantially at that size.

EXAMPLE VI

Steps 1. and 2. are as given in the Preamble above.

3. Twelve (12) ounces of the so prepared dry-roasted peanuts and three-fourths (¾) ounce of the so prepared raisins were mixed together. The mixed nuts and fruit were then fed into a small hammer mill and forced thereby through a screen having a size of 093.

The resultant product was a mixture of some butter of the peanuts with the raisins mixed with it, and some granules of the nut butter and raisins. The granules were not stable and appeared to be able to form a peanut butter with only a slight change in the surrounding conditions.

EXAMPLE VII

Steps 1. and 2. are as given in the Preamble above.

3. Sixteen (16) ounces of the so prepared dry-roasted peanuts and eight (8) ounces of the so prepared raisins were mixed together. The mixed nuts and fruit were then fed into a small hammer mill and forced thereby through a screen having a size of 093.

The resultant product was peanut butter-and-raisin granules or cells whose sizes varied greatly. The color was very, very dark, and the granules were damp to the touch, so that they did not appear to be workable with food handling equipment.

EXAMPLE VIII

Steps 1. and 2. are as given in the Preamble above.

3. Sixteen (16) ounces of the so prepared dry-roasted peanuts and six (6) ounces of the so prepared raisins were mixed together. The mixed nuts and fruit were then fed into a small hammer mill and forced thereby through a screen having a size of 093.

The resultant product was a peanut butter-and-raisin granule or cell whose size generally close to the size as determined by the screen size, in this instance 093. The granules were slightly dark in color, and were somewhat damp to the touch, but appeared to be sufficiently consistent for commercially usable with food handling equipment.

The foregoing detailed description is illustrative of several embodiments of the invention. It is to be understood, however, that additional embodiments will be perceived by those skilled in the art. The embodiments described herein, together with those additional embodiments are considered to be within the scope of the present inventon.

I claim:

1. A granular edible product in granule sizes of at least 035 screen size consisting of the granulated mixture of:
   a. at least one fruit selected from the group consisting of raisins and currants, which have been wetted in hot liquid of at least approximately 110 degrees Fahrenheit until a substantial amount of oil and surface sugar are removed therefrom; and
   b. at least one hard nut selected from the group consisting of peanuts, almonds, Brazil nuts and hazelnuts which have been dry-roasted until the nuts have become substantially hard and brittle.

2. The edible food product of claim 1 wherein the quantity of raisins, currants or both is present at from one ounce to six ounces per pound by weight of the total mixture, and the quantity of hard nuts is present at from fifteen ounces to nine ounces per pound by weight of the total mixture.

3. A granular edible product in granule sizes of at least 035 screen size consisting of the mixture of:
   a. from one ounce per pound to five ounces per pound by weight of the total mixture of at least one fruit selected from the group consisting of raisins and currants which has been wetted in liquid heated to a predetermined temperature which is sufficient to remove a substantial amount of oil and surface sugar from said fruit; and
   b. from fifteen ounces per pound to eleven ounces per pound by weight of the total mixture of hard nuts selected from the group consisting of peanuts, almonds, Brazil nuts and hazelnuts which have been dry-roasted until the nuts have become substantially hard and brittle.

4. The product of claim 3 wherein said fruit has been wetted in heated liquid at from approximately 110 degrees Fahrenheit to the boiling point of said liquid.

5. The product of claim 3 wherein said liquid is water.

6. The product of claim 3 wherein said fruit comprises black raisins.

7. The edible food product of claim 3 wherein said fruit has been wetted with heated liquid in the presence of flaxseeds.

8. The edible food product of claim 3 wherein said raisins or currants are pressed dry to a substantially damp-dry state and the raisins or currants are shakened loose from each other before and during mixture with nuts.

9. The product of claim 3 wherein the nuts have been roasted at from approximately 300 degrees to 600 degrees Fahrenheit.

10. The product of claim 3 wherein the product has granule shapes in the range of from 035 screen size to 120 screen size.

11. A process of producing a granulated food product comprising:
    a. wetting at least one fruit selected from the group consisting of raisins and currants in heated liquid heated to a predetermined temperature sufficient to remove a substantial amount of oil and surface sugar from said fruit;
    b. roasting nuts selected from the group consisting of peanuts, almonds, Brazil nuts and hazelnuts until the nut becomes hard and crispy;
    c. mixing to form a mixture from one to five ounces per pound by weight of the total mixture of the selected wetted fruit with from fifteen to eleven ounces per pound by weight of the total mixture of the selected nuts; and
    d. grinding the mixture and forcing it through a screen to form a granular formation of granules having granule sizes of at least 035 screen size.

12. The process as claimed in claim 11 where in the grinding step, the mixture is granulated to sizes in the range of from 035 to 120 screen size.

13. The process of claim 11 where in the wetting step, the further treating comprises wetting the fruit in the presence of flaxseeds placed in the heated liquid.

14. The process of claim 13 wherein the flaxseeds comprise two pounds per fifty gallons of heated liquid.

15. The process of claim 11 wherein after the wetting step, the further treating of the fruit comprises pressing until substantially in the dry state and the wetted fruit comprises individual granules, and further shaking the granular formation maintaining the individual granules loose from each other before and during the mixing step.

16. The process as claimed in claim 15 where in the wetting and pressing steps, the fruit is wetted in water at from 110 degrees Fahrenheit to the boiling point thereof.

17. The process of claim 11 wherein said wetting step takes approximately ten minutes.

18. The process of claim 11 wherein the fruit consists of raisins.

19. The process of claim 11 wherein the nut comprises peanuts.

20. The process of claim 11 where in the roasting step, the nuts are dry roasted at from 300 to 600 degrees Fahrenheit.

* * * * *